(12) United States Patent
Travis et al.

(10) Patent No.: US 7,660,047 B1
(45) Date of Patent: Feb. 9, 2010

(54) FLAT PANEL LENS

(75) Inventors: Adrian Travis, Seattle, WA (US); Timothy A. Large, Bellevue, WA (US); Neil Emerton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/203,167

(22) Filed: Sep. 3, 2008

(51) Int. Cl.
*G02B 17/00* (2006.01)

(52) U.S. Cl. .................. 359/726; 359/727

(58) Field of Classification Search ......... 359/726–729, 359/732
See application file for complete search history.

(56) References Cited

U.S. PATENT DOCUMENTS

| | | | |
|---|---|---|---|
| 5,808,713 | A | 9/1998 | Broer et al. |
| 6,124,906 | A | 9/2000 | Kawada et al. |
| 6,529,179 | B1 | 3/2003 | Hashimoto et al. |
| 6,648,485 | B1 | 11/2003 | Colgan et al. |
| 6,867,828 | B2 | 3/2005 | Taira et al. |
| 6,981,792 | B2 | 1/2006 | Nagakubo et al. |
| 7,384,178 | B2 | 6/2008 | Sumida et al. |
| 7,410,286 | B2 | 8/2008 | Travis |
| 7,545,429 | B2 | 6/2009 | Travis |

FOREIGN PATENT DOCUMENTS

| | | |
|---|---|---|
| WO | 2001/072037 A1 | 9/2001 |
| WO | 2006082444 A2 | 8/2006 |
| WO | 2008038016 A1 | 4/2008 |

OTHER PUBLICATIONS

Chou, et al., "Imaging and Chromatic Behavior Analysis of a Wedge-Plate Display", Retrieved at<< http://www.di.nctu.edu.tw/2006TDC/papers/Flexible/06-012.doc>>, pp. 4.
Adrian Travis, "P-60: LCD Smear Elimination by Scanning Ray Angle into a Light Guide", Retrieved at<< http://www2.eng.cam.ac.uk/~arlt1/P_60.pdf>>, pp. 474-477.
Boual, et al., "Wedge Displays as Cameras", Retrieved at<< http://www.camfpd.com/72-3.pdf>>, pp. 4.
A. R. L. Travis, et al., Optical Design of a Flat Panel Projection Wedge Display, 9th International Display Workshops, paper FMC6-3, Dec. 4-6, 2002, Hiroshima, Japan.

*Primary Examiner*—Darryl J Collins

(57) ABSTRACT

A flat panel lens system as a tapered light guide that has minimal or no margin for fan out. The tapered light guide includes a thin end, and a thick end of which is a bevelled mirror or an optical equivalent. Light is injected into the thin end and the mirror is such that rays injected through a point at the thin end emerge collimated from one of the light guide surfaces, and that collimated rays injected at an appropriate angle through one of the light guide surfaces emerge from a point at the thin end. Bragg gratings can be utilized for color implementations as well. The tapered light guide can be fabricated as a single piece, by extrusion, injection molding, or the combination/variation of extrusion and injection molding, as well as other commonly known techniques.

20 Claims, 16 Drawing Sheets

FLAT PANEL LENS

BACKGROUND

It is well known that rays emanating from a point in the focal plane of a lens are collimated and that parallel rays incident on a lens are concentrated to a point. A flat panel lens collimates rays emanating from a point but needs no volume for rays to fan out between the point and the plane of ray collimation. In a flat panel lens, however, the point and plane periphery are separate and there is an undesirable margin inbetween the point and plane periphery.

There is space between an ordinary lens and each of its focal planes and this can also make optical systems bulky. One proposed solution discloses a flat panel lens that collimates rays emanating from a point, or from a point to a flat panel lens, within a slim tapered light guide. The focal point and exit surface are approximately coplanar but displaced from one another because a slab of light guide is disposed between the two in order that rays can fan-out from the focal point to the exit surface.

Rear projection televisions are normally bulky because space is required between the video projector and diffusive screen in order that the picture fills the screen. The space may be replaced by a flat panel lens but there is no need to collimate the light because the screen necessarily destroys collimation. Thus, a simple tapered optical waveguide with uniform cross-section can suffice. However, a slab of light guide within which rays from the projector fan-out forms a blank margin on the screen where users would rather want to see the picture fill the screen.

Alternatively, a pair of prisms can be used to fold the slab behind the screen, but the slab, tapered waveguide and prisms must be carefully aligned and this has the potential to be costly. In yet another attempted solution, the direction of rays may be reversed in all linear optical systems and a tapered light guide may be used to remove the space between a camera and the object being photographed. However, a slab of light guide is again required, this time so that rays can fan-in. Although the resulting margin may be removed with folding prisms, these again, can be very costly.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Disclosed is a flat panel lens as a tapered light guide that has minimal or no margin. No folding prisms are utilized and the light guide can be formed from a single piece of transparent material. In one implementation, the tapered light guide includes a thin end, and a thick end of which is a bevelled mirror or an optical equivalent. The bevel is such that rays injected through a point at the thin end emerge collimated from one of the light guide surfaces, and that collimated rays injected at an appropriate angle through one of the light guide surfaces emerge from a point at the thin end.

The light guide finds particular application to flat panel displays and displays that provide direct human tactile interaction (independent of conventional input devices such as mice and keyboards, for example), cameras, and projection televisions, to name just a few. The tapered light guide can be fabricated as a single piece, by extrusion, injection molding, or the combination/variation of extrusion and injection molding, as well as other commonly known techniques.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
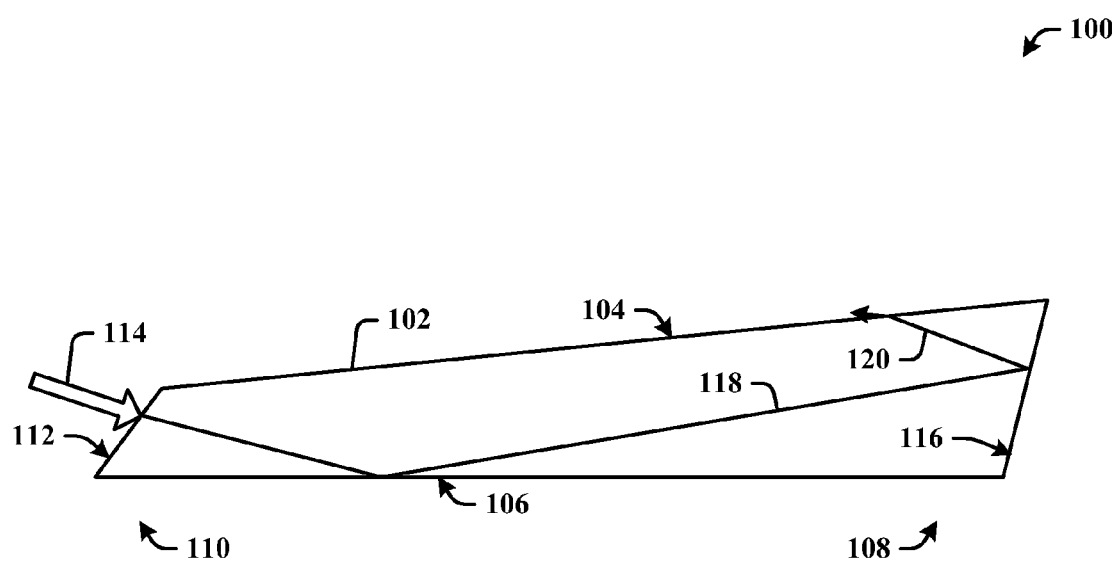
FIG. 1 illustrates a lens system the characteristics and dimensions of which reduce or eliminate the margin on a display.

Disclosed is a wedge (or tapered) light guide where the point source of light is placed at the thin end and the thick end is a reflector tilted so as to reduce the angle between rays and the plane of the light guide. The reflector can include a zig-zag (or Fresnellated) surface. The thick end can be curved about a point distant from the thin end of the wedge by one wedge length in a direction parallel to the axis of taper. Additionally, the thick end can be twice as thick as the thin end. The thickness profile of the wedge is proportional to sin [(z+L)/kL], where z is distance from the thin end, L is the length of the wedge, and k is a constant.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a lens system 100 the characteristics and dimensions of which reduce or eliminate the margin on a display. The lens system 100 includes a wedge-shaped light guide 102 having a first guide surface 104 and second guide surface 106 that tapers from a thick end 108 to a thin end 110. The light guide 100 also includes a receiving face 112 at the thin end 110 for receiving light 114 injected into the light guide 102, and a reflecting face 116 (also referred to as a bevelled or tilted mirror, and reflecting surface) at the thick end 108 of the light guide 102 for deflecting incident light 118 back to the first guide surface 104 (and possibly the second guide surface 106), the deflected incident light 120 (or specular light) exiting the first guide surface 104 (or display surface) before reaching the receiving face 112.

Figure 2:
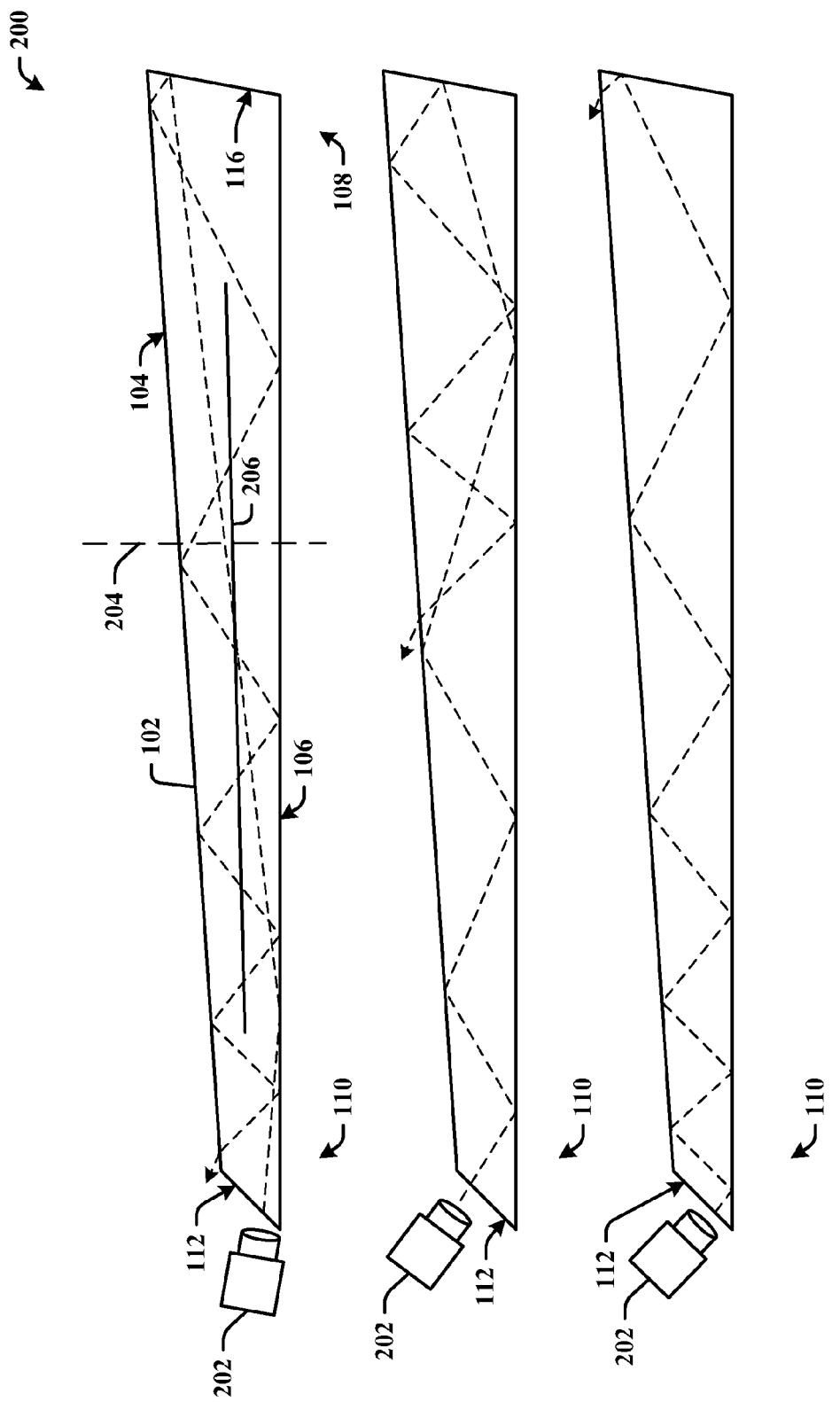
FIG. 2 illustrates examples of light injected into the receiving face of the light guide at different angles from a light source and the deflected light from the reflecting face at the thick end.

FIG. 2 illustrates examples 200 of light injected into the receiving face 112 of the light guide 102 at different angles from a light source 202 and the deflected light from the reflecting face 116 at the thick end 108. The reflecting face 116 (the bevelled mirror) causes rays injected at the thin end 110 to be deflected in such a way as to reach a critical angle (the angle at which the light will depart the light guide 102 rather than reflect internally) and depart the tapered waveguide (the light guide 102) at a point dependent on the associated angle of injection by the light source 202. The reflecting face 116 deflects incident rays so that the deflected incident rays return toward the thin end 110 but with a much reduced angle relative to an axis 204 perpendicular to a plane 206 of the light guide 102. After deflection, the diminishing thickness encountered in the direction of the thin end 110 by each ray causes the ray angle to reduce until the ray angle is less than the critical angle (for the particular material of the light guide 102), at which point the ray emerges from a guide surface (first guide surface 104 and/or second guide surface 106) of the light guide 102.

In the top example 200, the injected ray from the light source 202 enters the guide 102 at a low angle, deflects off the reflecting surface 116 and returns nearly to the receiving face 112 before exiting the first guide surface 102. In the middle example 200, the injected ray from the light source 202 enters the guide 102 at a higher angle than in the top example, deflects off the reflecting surface 116 and returns to exit the light guide 102 near the middle before reducing to the critical angle to exit the first guide surface 102. In the bottom example 200, the injected ray from the light source 202 enters the light guide 102 at a still higher angle than in the middle example, deflects off the reflecting surface 116 and returns to exit the light guide 102 at the first surface 102 near the reflecting face 116. Thus, it is easy to see that by adjusting the angle at which the light source injects the light into the receiving face 112, the margin can be reduced or eliminated entirely when viewed from the first surface 104.

Figure 3:
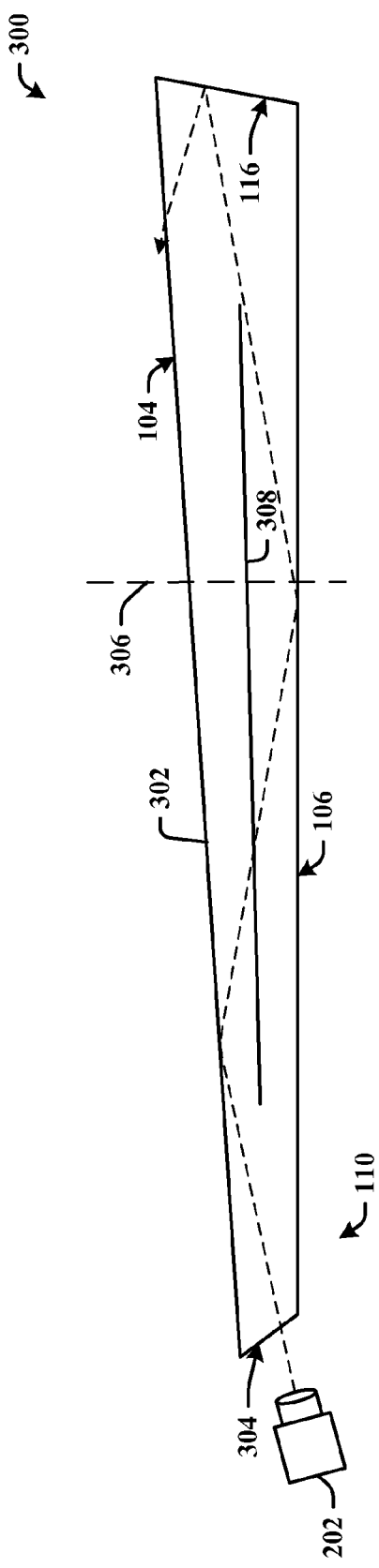
FIG. 3 illustrates an alternative light guide having a light guide with a receiving face oriented at a different angle suitable to provide specular light that exits the first guide according to the critical angle.

FIG. 3 illustrates an alternative light guide system 300 having a light guide 302 with a receiving face 304 oriented at a different angle suitable to provide specular light that exits the first guide surface 104 according to the critical angle. The reflecting face 116 (the bevelled mirror) causes rays injected into the receiving face 304 at the thin end 110 to be deflected in such a way as to reach the critical angle and depart the tapered waveguide (the light guide 302) at a point dependent on the associated angle of injection by the light source 202. The reflecting face 116 deflects incident rays so that the deflected incident rays (or specular rays) return toward the thin end 110 but with a much reduced angle relative to an axis 306 perpendicular to a plane 308 of the light guide 302. After reflection, the diminishing thickness encountered in the direction of the thin end 110 by each ray causes the ray angle to reduce until the ray angle is less than the critical angle, at which point the ray emerges from a guide surface (the first guide surface 104 and/or second guide surface 106) of the light guide 302.

Figure 4:
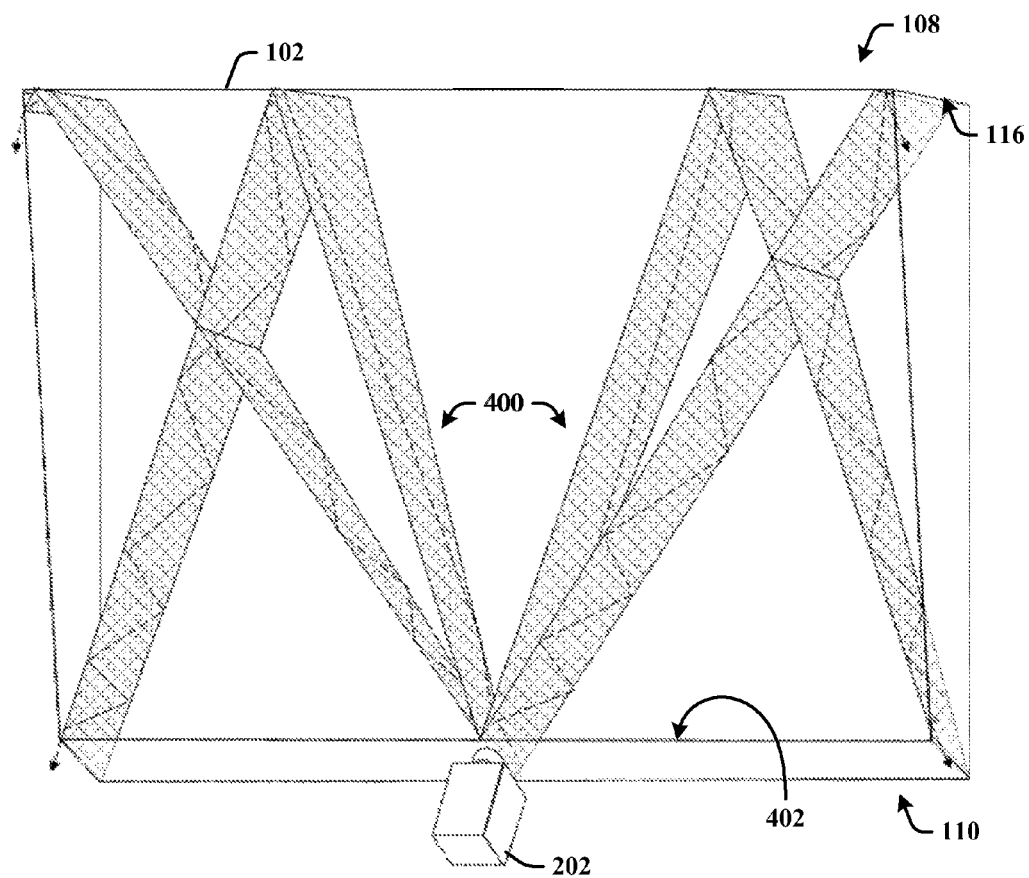
FIG. 4 illustrates that rays injected into the center of the thin end of the light guide can fan out to the width of the light guide.

FIG. 4 illustrates that rays 400 injected into the center of the thin end 110 the light guide 102 can fan out to the width of the light guide 102 so that after deflecting off the reflecting face 116 (also called the bevelled mirror) at the thick end 108, the rays 400 illuminate the whole area (the entirety) of a front surface 402 (similar to the first guide surface 104) of the light guide 102. Light exiting the whole area of the front surface 402 is represented by ray arrows exiting near each of the four corners of the front surface 402. There is therefore no need for a blank margin within which rays can fan out, as in conventional systems in the lower half of the light guide 102 near the light source 202.

It has been shown conventionally that for a smooth light guide, the product of light guide thickness with the cosine of the ray angle relative to the perpendicular of the light guide is a constant number. It follows that thickness times the sine of the ray angle relative to the plane of the light guide is also a constant number. The sine of a small angle is approximately proportional to the angle itself, so it can be said that the product of the thickness with the ray angle itself is approximately constant. Consider that light rays are injected into the thick end 108 into the light guide 102 by the light source 202 (e.g., laser, LED) at a uniformly distributed range of angles between zero and the critical angle, and that the light guide 102 gradually tapers to half its input thickness (e.g., at the thin end 110). The angle of rays reaching the thin end 110 will have doubled so half of the injected rays have exceeded the critical angle and are no longer guided.

Instead, as in the disclosed technique, rays are injected at the thin end 110 and the angles of the rays 400 will all be less than half the critical angle at the thick end 108. An appropriately angled reflecting face 116 reflects the rays 400 so that all rays 400 are returned at greater than half the critical angle. Thus, all rays 400 leave the light guide 102 before reaching the thin end 110. Therefore, in one implementation, the thick end 108 of the light guide 102 is at or about twice the thickness of the thin end 110.

The three rays shown in the top, middle and bottom examples 200 of FIG. 2 are all incident on the reflecting face 116 at the thick end 108 from the left-hand side in the light guide 102. Rays will, however, also be incident from the right-hand side and these rays will propagate back down the light guide 102 and be lost to the system through the thin end 110, so there can be gaps in the projected image.

Figure 5:
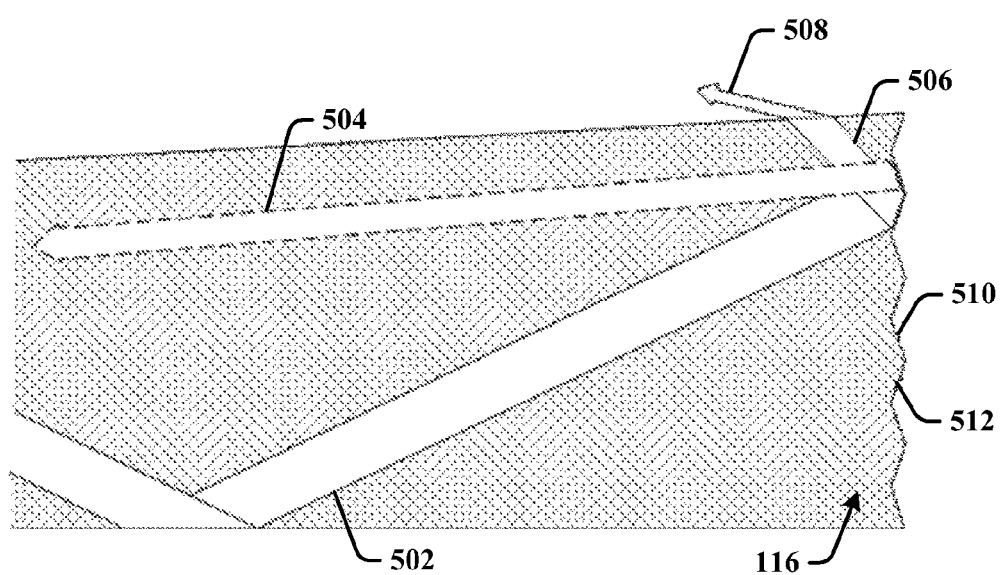
FIG. 5 illustrates that the reflecting face can be configured as a Fresnellated surface of alternate mirror angles.

FIG. 5 illustrates that the reflecting face 116 can be configured as a Fresnellated surface 500 of alternate mirror angles. The Fresnellated surface 500 can be embossed on the thick end 108 to ensure that for any incident ray 502, a portion 504 of the ray 502 is lost, but a specular portion 506 goes on to form an image 508 so that the image is uniform and formed free of gaps (margins). Accordingly, the Fresnellated surface 500 for the reflecting face 116 on the thick end 108 comprises pairs of reflecting planes (510 and 512) the normals of which share the same component resolved in the plane of the light guide 102 but have equal and opposite components perpendicular to the plane of the light guide 102.

Discontinuities in an image projected through a tapered light guide with straight sides will form at the point where a small change in ray injection angle causes the ray to undergo an extra reflection. The lower part of the projected image on the front surface 402 in FIG. 4 is closer to the light source 202 (e.g., projector) than the upper part, so the projected image can be subject to keystone distortion (a distortion in image dimensions that makes the image look similar to a trapezoid) because the reflecting face 116 at the thick end 108 is flat.

Figure 6:
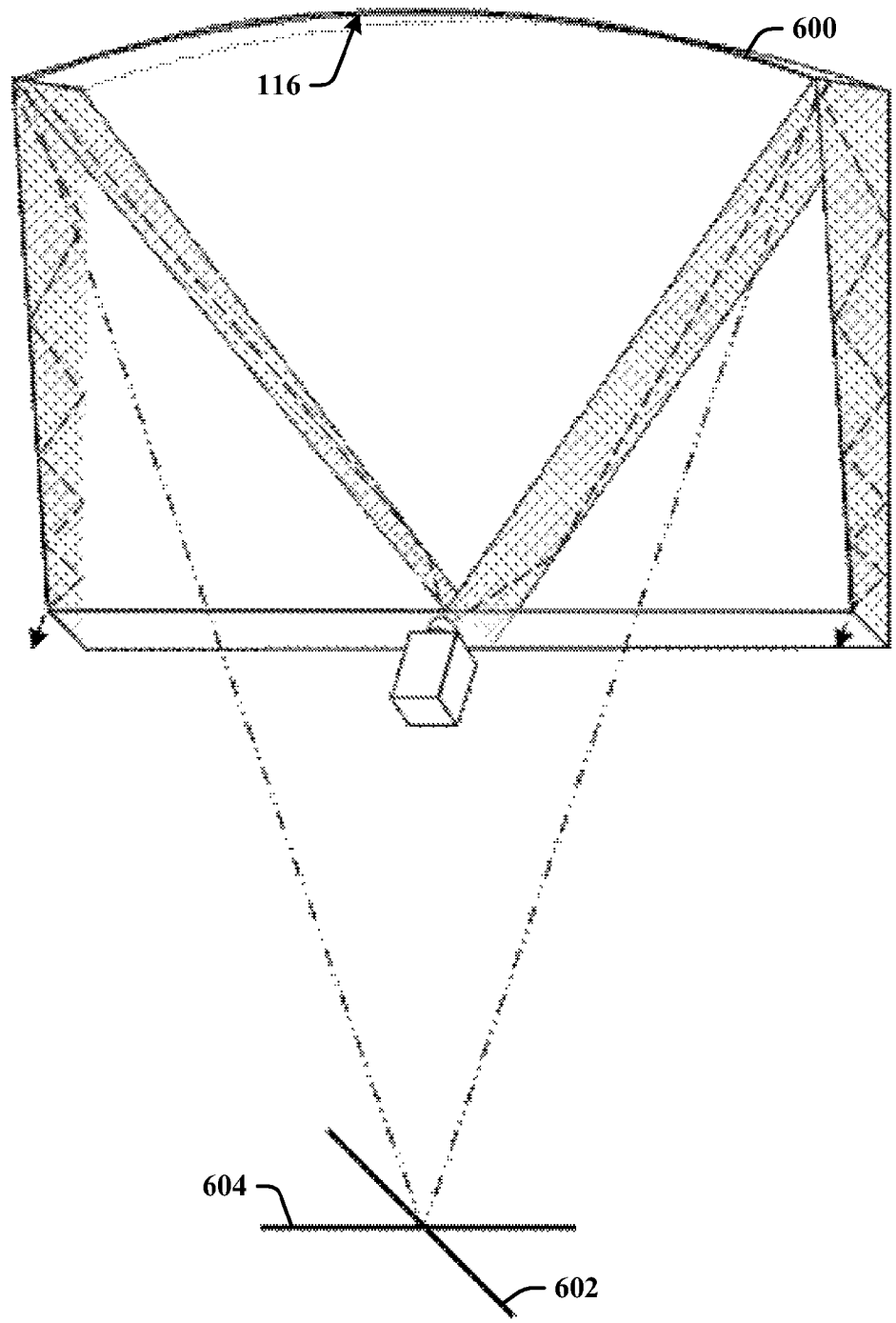
FIG. 6 illustrates an alternative embodiment of a light guide having curved surfaces in which all rays undergo the same number of reflections before exit.

FIG. 6 illustrates an alternative embodiment of a light guide 600 having curved surfaces in which all rays undergo the same number of reflections before exit. The reflecting face 116 is curved about an axis 602 perpendicular to the plane of the light guide 600 and with a radius of curvature equal to twice the length of the light guide 600. Rays no longer fan out after reflection so keystone distortion is eliminated. However, it can be desirable that the edges of a display be straight. Thus, the reflecting face 116 may instead be a Fresnel surface and the collimating action of this may be integrated with the actions of the reflecting planes 510 and 512 (of FIG. 5) into a single prismatic surface.

The surface provided by curving the reflecting face 116 is approximately cylindrical. A disadvantage of cylindrical mirrors (or surfaces) is the introduction of an astigmatism that can degrade resolution. This is resolved as follows.

Figure 7:
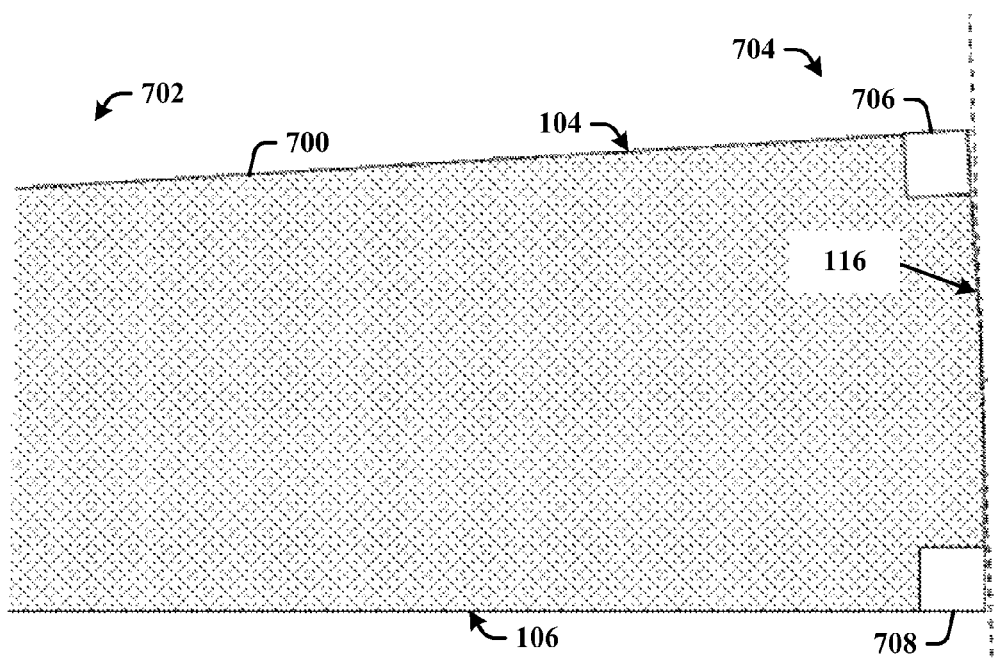
FIG. 7 illustrates a light guide that provides a smooth transition from the tapered section to a section with parallel sides before light rays encounter the reflecting face.

FIG. 7 illustrates a light guide 700 that provides a smooth transition from the tapered section 702 to a section 704 with parallel sides before light rays encounter the reflecting face 116. The reflecting face 116 at the end of the light guide 700 is curved with a uniform radius of curvature such that a first corner 706 defined by the first guide surface 104 and the curved reflecting face 116, and a second corner 708 defined by the second guide surface 106 and the curved reflecting face 116, both are right angles. When employing the Fresnel surface 500 of FIG. 5, the reflecting planes (510 and 512) conform to this curvature so that the angle made by each of the planes (510 and 512) relative to the reflecting face 116 is constant.

Figure 8:
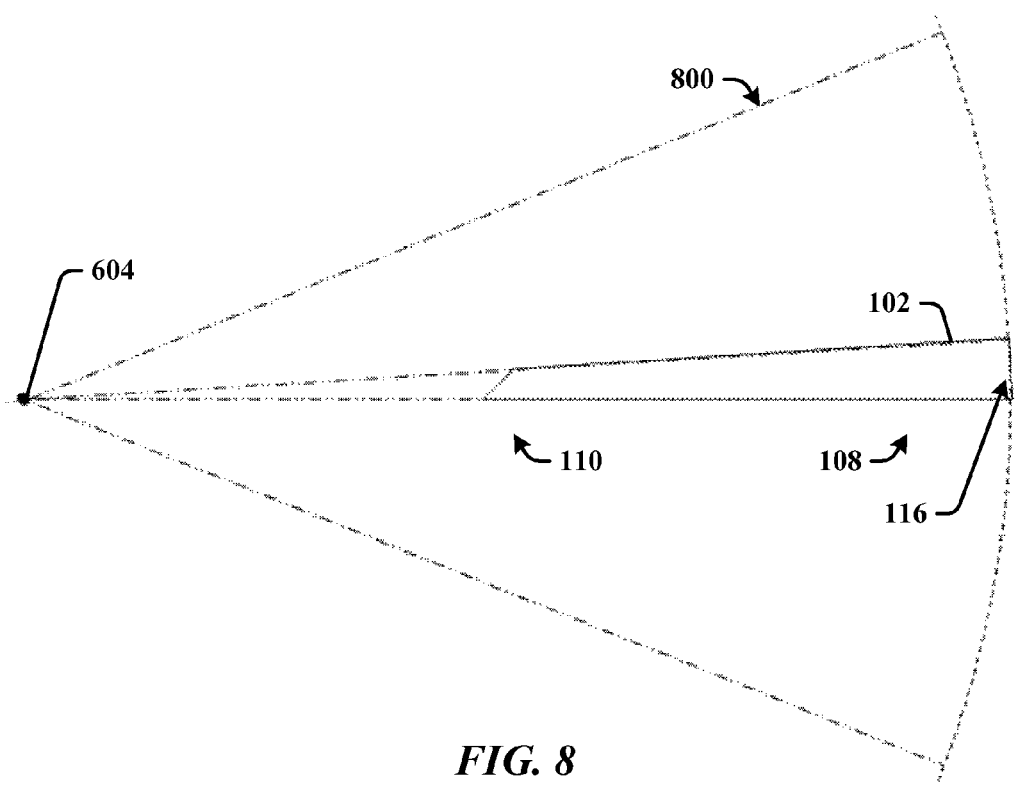
FIG. 8 illustrates that the radius of curvature of the thick end can be twice the length of the light guide.

FIG. 8 illustrates that the radius of curvature 800 of the thick end 108 can be twice the length of the light guide 102. As described herein above in one implementation, it can be optimal for the thick end 108 of the light guide 102 to be double the thickness of the thin end 110. Moreover, since the light guide 102 has flat surfaces (the first guide surface 104 and second guide surface 106), the radius of curvature for the thick end 108 equals twice the length of the light guide 102. This means that the reflecting face 116 has the same radius of curvature about the axis 604 depicted in FIG. 6 as indicated about axis 602 in order to minimize keystone distortion. The combined curvature of the thick end 108 is therefore spherical, in which case the reflecting face 116 introduces no astigmatism and resolution is not degraded.

The path of a ray through a light guide can be found by tracing the ray alternately to upper and lower surfaces and calculating the angle of reflection off each surface; however, this can be laborious and poorly informative. If the light guide has flat surfaces, it is simpler and optically equivalent to draw a ray straight through a stack of duplicates of the tapered light guide until the ray crosses an intersection at less than the critical angle, when the ray will in reality emerge into air. It is also permissible to use a reverse approach by drawing the ray in reverse; in other words, rather than injecting the ray at one end of the light guide and tracing ray progression until it emerges from a surface, the ray can be traced from the surface of a stack of light guides back to a light guide end with the proviso that the ray leaves the surface at the critical angle and never exceeds the critical angle.

Figure 9:
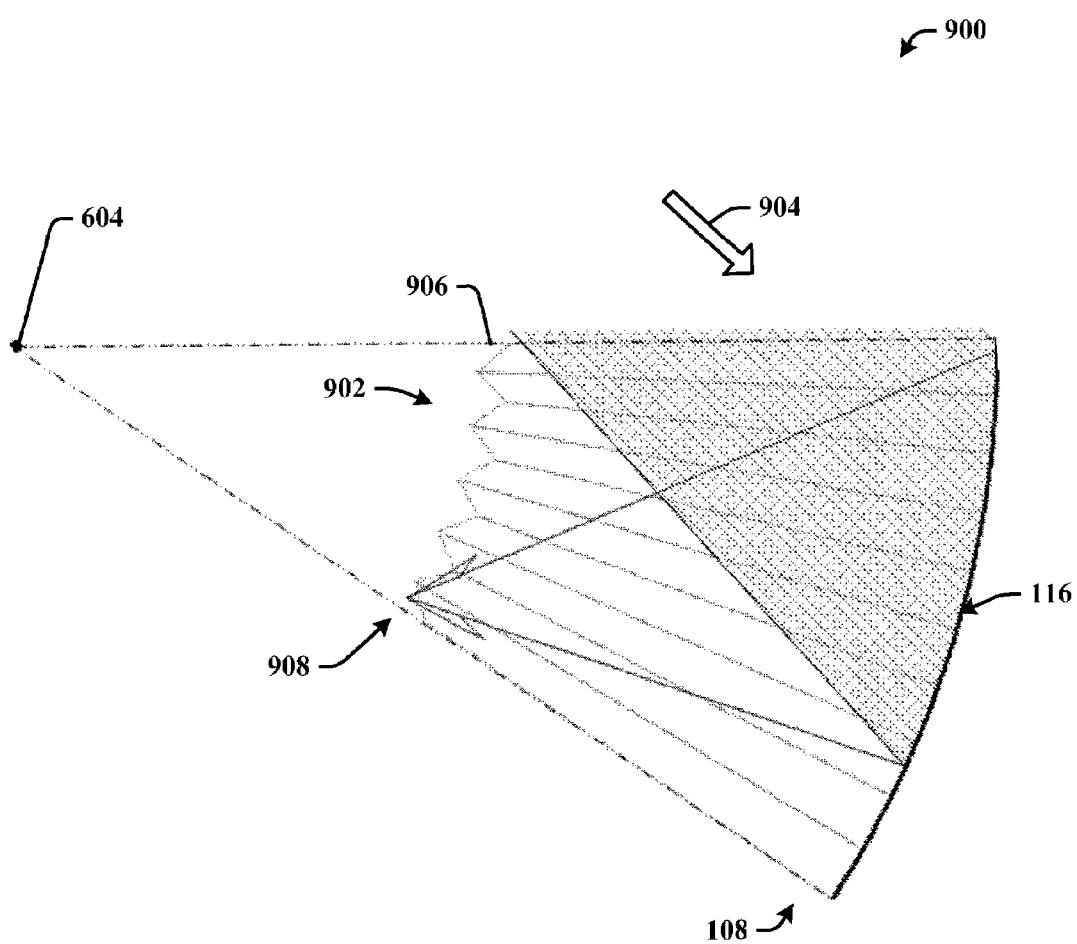
FIG. 9 illustrates a diagram that employs a representation of duplicate light guides in which the thick end of each is curved according to the implementations described in FIG. 7 and FIG. 8.

FIG. 9 illustrates such a diagram 900 that employs a representation of duplicate light guides 902 in which the thick end 108 of each is curved according to the implementations described in FIG. 7 and FIG. 8. Using the reverse approach described above, incident rays 904 imposed on what can actually be an exit surface 906 (similar to first guide surface 104) reflect off the reflecting face 116 of thick end 108. The duplicate light guides 902 at the thick end 108 combine into a curve of constant radius, thereby concentrating parallel rays approximately to a point 908 at a distance equal to half the radius of curvature of the curve.

If the thick end 108 were perfectly smooth, this point 908 would be at the thin end 110 of the top light guide of the duplicate light guides 902, but the action of the Fresnel planes (510 and 512 of FIG. 5) is to deflect half of each ray such that the point of focus of the deflected halves is at the thin end 110 of one of the duplicates 902 lower in the stack. In an optimum implementation, all rays undergo the same number of reflections between entrance and exit. FIG. 9 demonstrates that this is an inherent property of the embodiment illustrated because each ray crosses the same number of light guide interfaces as any other ray.

Perpendicular to the plane of FIG. 9, rays traced from the thin end 110 are approximately collimated by reflection off the spherical surface of the reflecting face 116, so an image projected through the light guide experiences little distortion. Collimated rays have no skew, so the projected image exhibits uniformity.

Additionally, rays can be injected into the receiving face at the thin end of the light guide so as to emerge from any point on the display surface, thereby reducing, or eliminating margins entirely. That the sides of the light guides have no curvature helps preserve the resolution of an image projected through the light guide. Moreover, this also means that the lens system is simple to make.

To make the tapered light guide surfaces (e.g., first guide surface 104 and second guide surface 106), the base of a polishing machine can be tilted, a sheet of high transparency glass waxed on top and polished flat. To make the spherically curved reflecting face 116 (bevelled mirror), several such tapered light guides can be waxed together in a stack and a sphere polished on the end as if on a conventional lens surface. The Fresnellated planes (510 and 512) can then be cast on a film, stretched over the spherical reflecting face 116, and then glued on.

Figure 10:
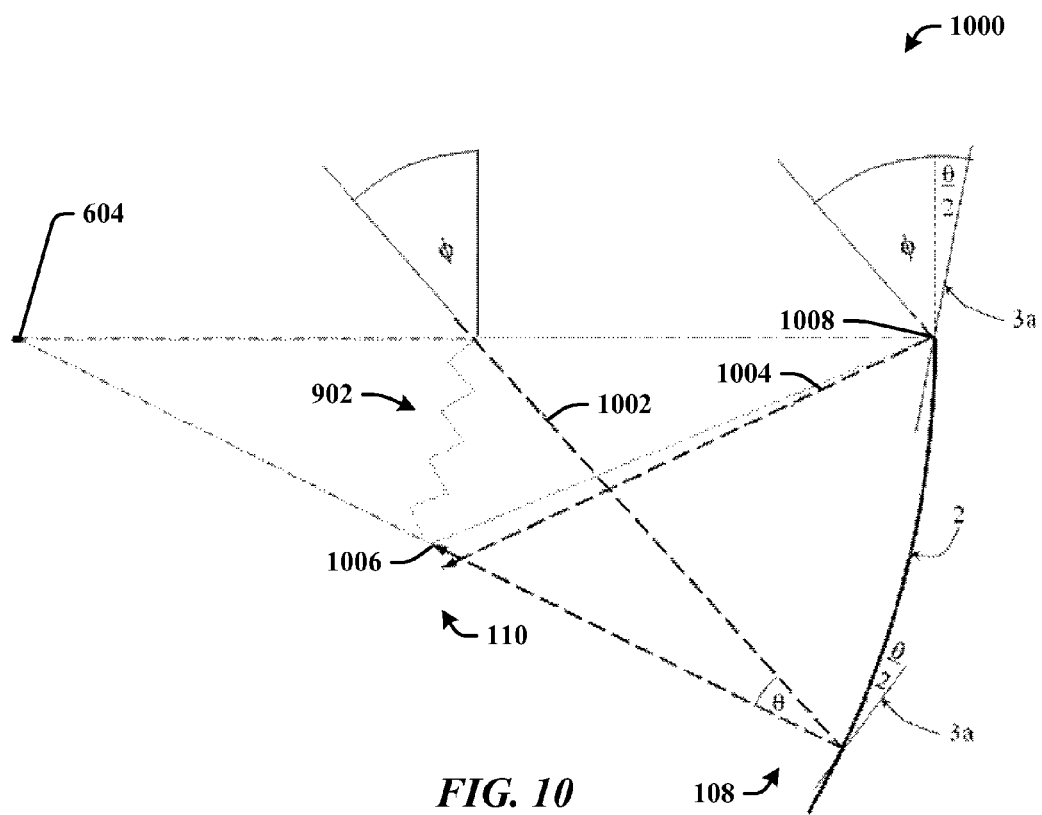
FIG. 10 illustrates a technique for deriving a minimum thickness of the light guide when the light guide surfaces are flat.

FIG. 10 illustrates a technique 1000 for deriving a minimum thickness of the light guide when the light guide surfaces are flat. A spherical curvature on the reflecting face 116 reflects parallel rays not to a point but to a spot of finite thickness, and the light guide can be designed to be no thinner than the size of the spot. FIG. 10 applies geometry to FIG. 9 to show how this minimum thickness can be calculated. Two rays (1002 and 1004) are shown, and the point of exit 1006 of ray 1002 is proximate the thin end 110, while the point of exit 1006 of ray 1004 is proximate the thick end 108. All rays (1002 and 1004) are at the critical angle $\phi$ just before exiting. Tracing of both rays (1002 and 1004) backwards at this angle is performed straight through the stack of light guide duplicates 902 until the rays (1002 and 1004) meet the thick end 108.

When employing the Fresnel planes (510 and 512), after reflection off the Fresnel plane 510 at the thick end 108, tracing of the ray 1002 back to the thin end 110 parallel to the plane of the light guide duplicate can be performed. The reflected part of ray 1002 is at some angle θ to the incident part of the ray, which angle θ can be calculated, while Fresnel plane 510 is at an angle θ/2 to the spherical curvature of the reflecting face 116.

Ray 1004 reflects off the same Fresnel plane 510. Thus, the angle of the reflected part of ray 1004 can be calculated. By symmetry, this angle equals θ, if ray 1002 and ray 1004 are to meet at the thin end 110. Geometry calculations show that if the critical angle φ equals 42 degrees, θ equals 21 degrees, while ray 1004 instead is reflected at 24 degrees to the wedge surface (e.g., the first guide surface 104), a difference of about three degrees.

Focus can be improved if very thin light guides are to be made. However, the symmetry of FIG. 9 indicates that the thick end 108 be a simple curve. Rather than altering the geometry of the thick end 108, the sides of the tapered light guide can be curved and many such light guides joined in the manner of FIG. 9 will map onto a spheroid, similar to the peel slices of a segmented orange. The surface curvature desired of a very thin tapered light guide can be found by drawing FIG. 10 on a spheroid whose radius of curvature is such that all rays reflected off the thick end 108 meet at a point. This is now described.

Figure 11:
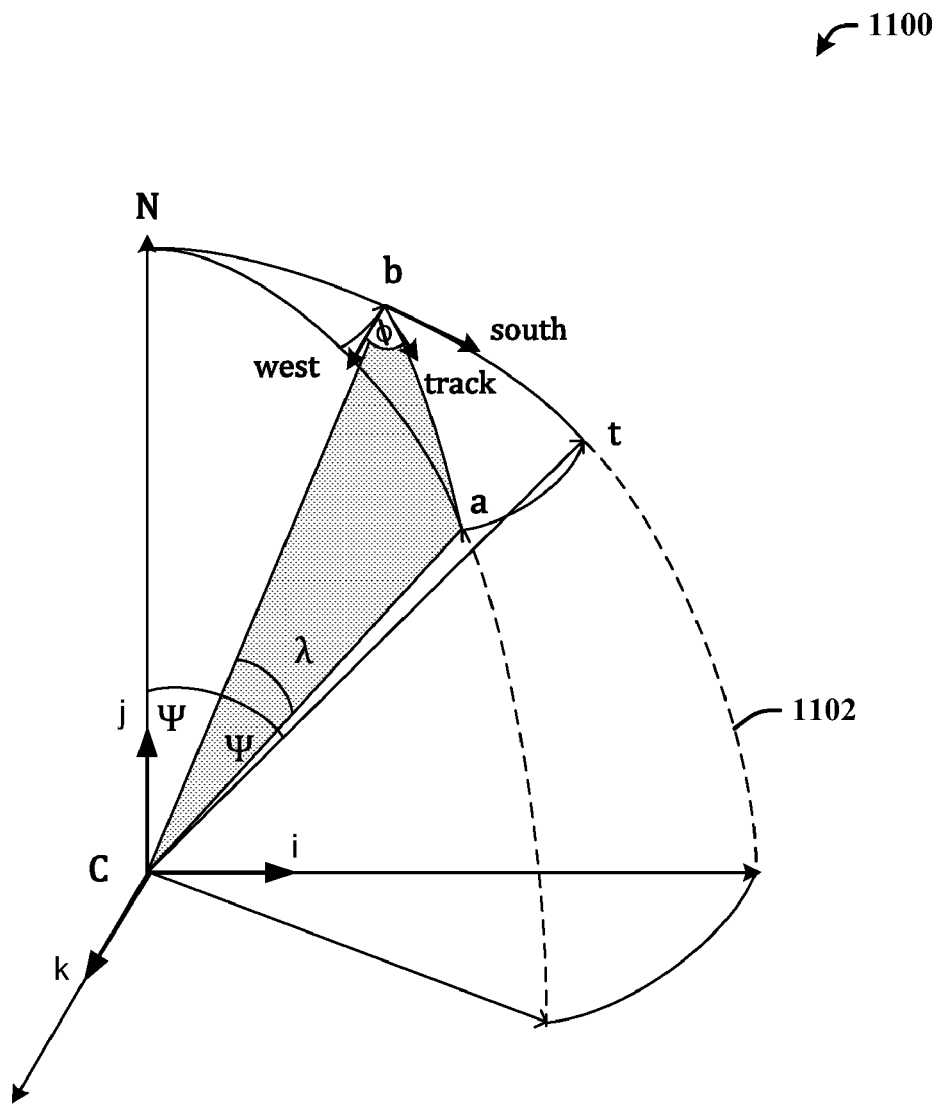
FIG. 11 illustrates a technique for drawing FIG. 10 on a spherical surface so that rays entering either end of the light guide surface meet as when leaving the thin end.

FIG. 11 illustrates a technique 1100 for drawing FIG. 10 on a spherical surface so that rays entering either end of the light guide surface meet as when leaving the thin end 110. FIG. 11 depicts a section of a sphere 1102, having a North Pole N, where the ray 1002 of FIG. 10 moves from position b at a latitude of ψ degrees to the North Pole N at a Southwesterly angle φ according to a vector called track. The ray 1002 stops when at a latitude of 2ψ, the final position denoted by vector a. The initial direction of the ray 1002 was t, and the ray 1002 moved along a great circle route, so a can be expressed as a linear sum of b and t. If the arc ba of the great circle route has angle λ relative to the center C of the sphere, then, $$a = \cos\lambda\, b + \sin\lambda\, t$$

$$= \cos\lambda \begin{pmatrix} \sin\psi \\ \cos\psi \\ 0 \end{pmatrix} + \sin\lambda \begin{pmatrix} \sin\phi\cos\psi \\ -\sin\phi\sin\psi \\ \cos\phi \end{pmatrix}$$

Position a is at a latitude of 2ψ so the j component of a is equal to cos 2ψ:

$$a_j = \cos 2\psi \sqrt{1 - \sin^2\lambda\cos\psi - \sin\lambda\sin\phi\sin\psi}$$

So $$(1-\sin^2\lambda)\cos^2\psi = \cos^2 2\psi + \sin^2\lambda\,\sin^2\phi\,\sin^2\psi + 2\cos 2\psi\,\sin\lambda\,\sin\phi\,\sin\psi$$

And, $$0 = (\cos^2 2\psi - \cos^2\psi) + (2\cos 2\psi\,\sin\phi\,\sin\psi)\sin\lambda + (\sin^2\psi\,\sin^2\phi + \cos^2\psi)\sin^2\lambda$$

This is a quadratic equation solvable to obtain sin λ; then λ, and then a. The distance moved by the ray 1002 is λ times the radius of the sphere, but it is desirable to know θ, the direction of the ray 1002 as it reaches position a. This can be determined by calculating the normal n, to the great circle route, which the ray 1002 has just traveled; n is perpendicular to both b and t, thus:

$$n = b \times t = \begin{pmatrix} \sin\psi \\ \cos\psi \\ 0 \end{pmatrix} \times \begin{pmatrix} \sin\phi\cos\psi \\ -\sin\phi\sin\psi \\ \cos\phi \end{pmatrix} = \begin{pmatrix} \cos\psi\cos\phi \\ -\sin\psi\cos\phi \\ -\sin\phi \end{pmatrix}$$

A vector that is perpendicular to the circle of longitude through the ray's final position can be obtained by calculating j×a:

$$j \times a = \cos\lambda \begin{pmatrix} 0 \\ 1 \\ 0 \end{pmatrix} \times \begin{pmatrix} \sin\psi \\ \cos\psi \\ 0 \end{pmatrix} + \sin\lambda \begin{pmatrix} 0 \\ 1 \\ 0 \end{pmatrix} \times \begin{pmatrix} \sin\phi\cos\psi \\ -\sin\phi\sin\psi \\ \cos\phi \end{pmatrix}$$

$$= \cos\lambda \begin{pmatrix} 0 \\ 0 \\ -\sin\psi \end{pmatrix} + \sin\lambda \begin{pmatrix} \cos\phi \\ 0 \\ -\sin\phi\cos\psi \end{pmatrix}$$

$$= \cos\lambda \begin{pmatrix} 0 \\ 0 \\ -\sin\psi \end{pmatrix} + \sin\lambda \begin{pmatrix} \cos\phi \\ 0 \\ -\sin\phi\cos\psi \end{pmatrix}$$

Now, θ equals the angle between the line of travel and the line of longitude through a, so angle θ is also equal to the angle between the perpendiculars to both these lines. Hence:

$$\cos\theta = n \cdot \frac{j \times a}{|j \times a|} = \frac{\begin{pmatrix} \cos\psi\cos\phi \\ -\sin\psi\cos\phi \\ -\sin\phi \end{pmatrix} \cdot \begin{pmatrix} \sin\lambda\cos\phi \\ 0 \\ -\cos\lambda\sin\psi - \sin\lambda\sin\phi\cos\psi \end{pmatrix}}{|j \times a|}$$

$$= \frac{\cos\psi\sin\lambda\cos^2\phi + \sin\phi\cos\lambda\sin\psi + \sin\lambda\sin^2\phi\cos\psi}{\sqrt{\sin^2\lambda\cos^2\phi + (\cos\lambda\sin\psi + \sin\lambda\sin\phi\cos\psi)^2}}$$

By entering this into a spreadsheet, for example, and changing ψ until θ=24 degrees, it transpires that ψ must be 24°. Since the length L of the wedge (tapered light guide 102) is equal to the spherical radius R times ψ in radians, it follows that R=L/ψ, which equals 2.39L.

It remains to calculate the variation of thickness with length L of a wedge drawn on a spherical surface. At latitude β from the North Pole N, the radius of the line of latitude is R sin β. The wedge runs from latitude L/R to 2L/R, so wedge thickness T is proportional to sin [(z+L)/2.39L], where z is the distance along the wedge from the thin end to the thick end. This can be put more generally as the light guide has a thickness profile proportional to sin [(z+L)/kL], where z is distance from the thin end, L is a length of the light guide, and k is a constant.

The reflecting face 116 of FIG. 5 wastes half the light. The following describes how to eliminate this loss. The loss can be reduced or eliminated if Fresnel planes 510 and 512 are illuminated only by those rays from the thin end which the Fresnel surface reflects so as to emerge from the light guide surface, or similarly, in reverse (from the thin end when the rays are introduced to the light guide surface). For example, if a laser beam scanned by a vibrating mirror is pointed into the thin end, the beam should be switched on when the beam produces a reflection such as specular portion 506 of FIG. 5, but switched off when the beam produces a reflection such as portion 504. A photo-sensor can be placed at the thin end and used to switch the laser off whenever the unwanted reflection portion 504 is detected.

A laser beam may also be scanned by placing a liquid crystal display (LCD) in front of the beam and expressing a diffraction grating on the LCD, and an image can be produced by a superposition of diffraction gratings in a technique known as holographic projection. In this case, loss is minimized by ensuring that the pattern on the LCD is comprised only of gratings which direct light to Fresnel surfaces that do not produce wasted light, such as portion 504.

It is well known that light reflected off small facets (e.g., the Fresnel planes 510 and 512) is subject to aperture diffraction which degrades resolution. Aperture diffraction can be eliminated if a Bragg grating (a structure comprising layers whose refractive index alternates between two values and whose thickness alternates between two values) is used. By suitable choice of thickness and index, it is possible to design the reflecting face 116 so that it reflects monochromatic light over a desired range of angles but is otherwise transparent.

Figure 12:
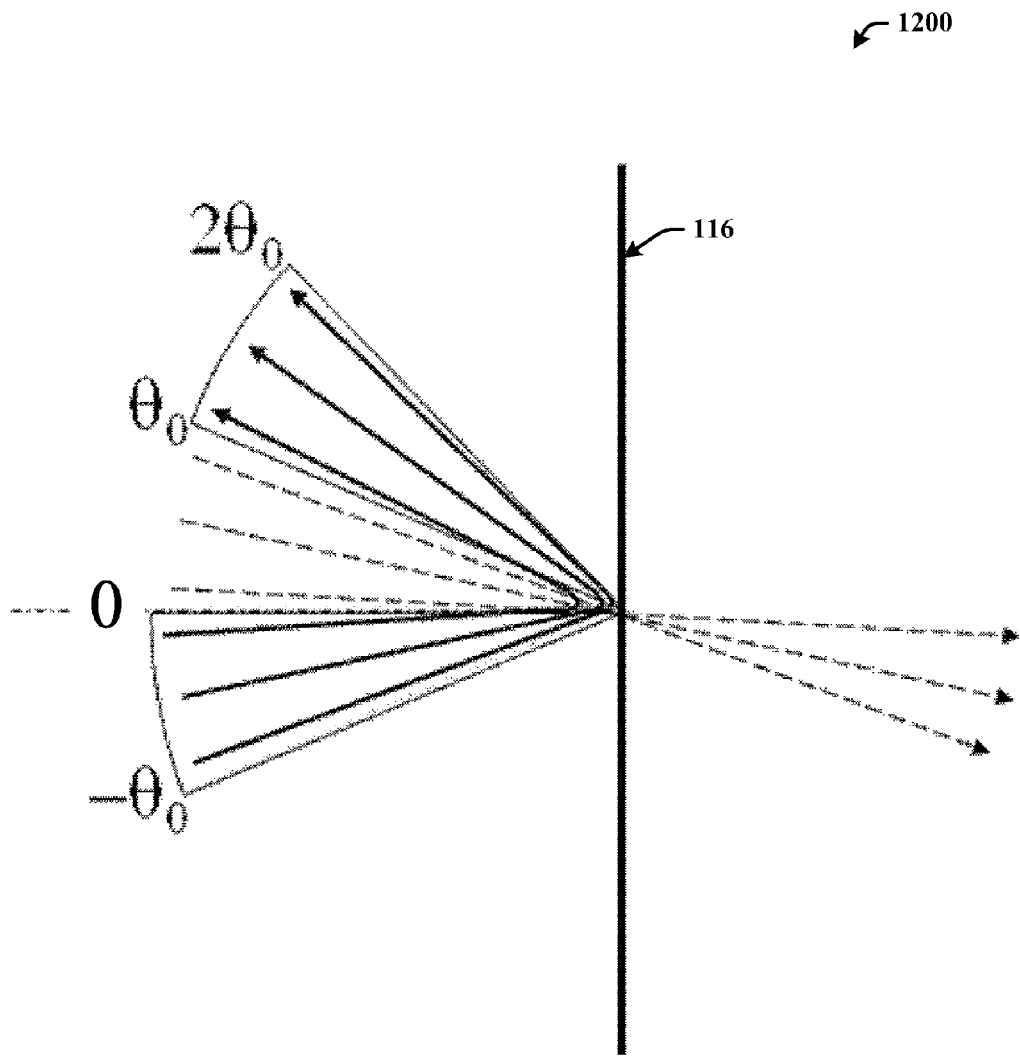
FIG. 12 illustrates the optical properties that can be employed for the reflecting face at the thick end.

FIG. 12 illustrates the optical properties that can be employed for the reflecting face 116 at the thick end. A graph 1200 shows that a single reflecting face 116 can be employed for deflecting rays in a range from $\theta_0$ to $2\theta_0$. A second reflecting face can be employed in combination with the reflecting face 116 to process rays in a range from zero to $-\theta_0$.

Figure 13:
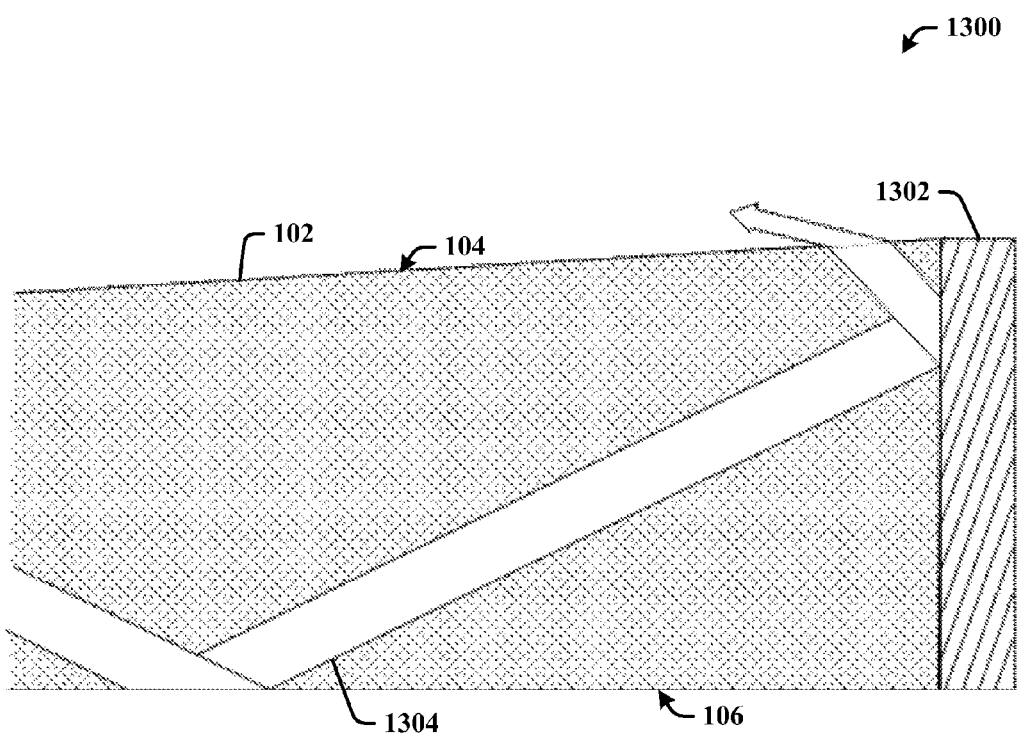
FIG. 13 illustrates a lens system where the reflecting face can be replaced by a Bragg reflector.

FIG. 13 illustrates a lens system 1300 where the reflecting face can be replaced by a Bragg reflector 1302. The reflector 1302 can therefore be designed to reflect all rays (e.g., ray 1304) from the lower surface (the second guide surface 106) of the tapered light guide 102, but to transmit all those rays from the upper surface (the first guide surface 104). A conventional planar or Fresnellated mirror can then be embossed beyond the reflector 1302 to reflect rays from the upper surface (e.g., first guide surface 102).

Figure 14:
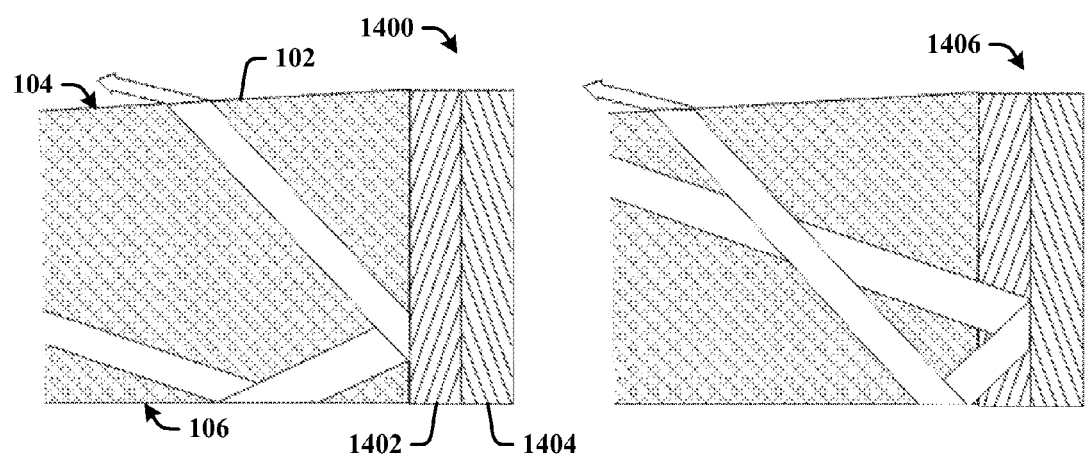
FIG. 14 illustrates that the reflecting face can be replaced by a pair of Bragg reflectors.

FIG. 14 illustrates that the reflecting face can be replaced by a pair of Bragg reflectors 1400. The two Bragg gratings 1400 may be superposed so that a first grating 1402 reflects rays from the lower surface (the second guide surface 106) of the light guide 102 and the other rays from the upper side (the first guide surface 104). Alternatively, the two gratings 1400 may be spatially superposed into a single grating 1406 which performs both functions.

Color displays are illuminated with red, green and blue (RGB) light so at least three wavelengths can be reflected by the Bragg gratings. These can be the wavelengths of lasers illuminating the video projector in a rear projection television, for example. Three pairs of separate gratings suffice to reflect rays of all three wavelengths incident both from the left-hand and right-hand sides but each pair reflects light only of its own wavelength. It is fortunate that this will happen if the grating is designed for a light guide with a refractive index typical of the most common transparent material as the following paragraph will elaborate.

A common transparent material such as poly(methyl methacrylate) or PMMA has a refractive index of 1.492 and a critical angle in air of 42 degrees. Thus, a light guide made of this material confines all rays at angles between 0 degrees and 48 degrees to the plane of the light guide. Rays are incident on the thick end at angles less than 24 degrees because the thick end has twice the thickness of the thin end, and all rays are reflected at angles greater than 24 degrees to emerge from the display surface when travelling back toward the thin end. In particular, a ray incident at 24 degrees is reflected at minus 48 degrees as if off a reflecting surface (mirror) angled at minus 12 degrees.

The Bragg grating which does this has a period equal to the magnitude of the vector sum of the incident and reflected wave vectors, which equals twice $\cos\{[24'-(-48°)]/2\}=0.81$ per wavelength. A normally incident ray reflects off a grating with two periods per wavelength, so a green ray will pass through a grating designed for blue if the blue to green wavelength ratio is 0.81. The green-to-red wavelength ratio is the same and RGB wavelengths of 430, 532 and 655 nanometers (nm), respectively, will suffice.

When selected according to these wavelengths, no one wavelength is affected by the gratings designed for the other two wavelengths, so the three pairs of gratings can be superposed in a single film. However, the eye's sensitivity at 655 nm may be poor. In such cases, the critical angle of the light guide can be increased so as to permit a smaller ratio between the wavelengths.

It may be difficult to apply a Bragg mirror onto the end of a light guide with the desired angular precision. An alternative technique is to create the Bragg grating by directing an ion beam through the side of the light guide. It is well known that the passage of energetic ions through a polymer can cause bonds to break and the refractive index to change. The ion beam can therefore be used to create the alternating layers of high and low refractive index that constitute a Bragg grating.

In one general, but non-exhaustive summary, a lens system implementation is provided that comprised a tapered light guide having a display surface and a second guide surface that taper from a thick end to a thin end, the thick end twice in thickness as the thin end; a receiving face at the thin end for receiving light injected into the light guide; and, a reflecting face at the thick end of the light guide for deflecting incident light back to the display surface, the reflecting face tilted to reduce angles of specular rays relative to a plane of the light guide so that the specular rays exit the display surface before reaching the receiving face.

The tilted reflecting face is a Fresnellated surface and can be curved about a point distant from the thin end by one light guide length in a direction parallel to an axis of taper. The light guide has a thickness profile proportional to $\sin[(z+L)/kL]$, where z is distance from the thin end, L is a length of the light guide, and k is a constant. The reflecting face includes one or more reflecting gratings having layers with refractive indexes that alternate between two index values and thickness that alternates between two thickness values, the one or more reflective grating eliminate aperture diffraction.

The reflecting face is spherically curved according to a uniform radius of curvature, and an angle formed between the display surface and the curved reflecting face is equivalent to an angle formed between the second surface and the curved reflecting face, and the display surface and the second guide surface each form a right angle to the reflecting face at the thick end.

The injected light entering the receiving face includes rays all of which undergo a same number of reflections prior to exiting the display surface. The reflecting face is comprised of three sets of Bragg gratings for illuminating the display surface using red, green, and blue colors. The light guide can be composed of poly (methyl methacrylate).

Figure 15:
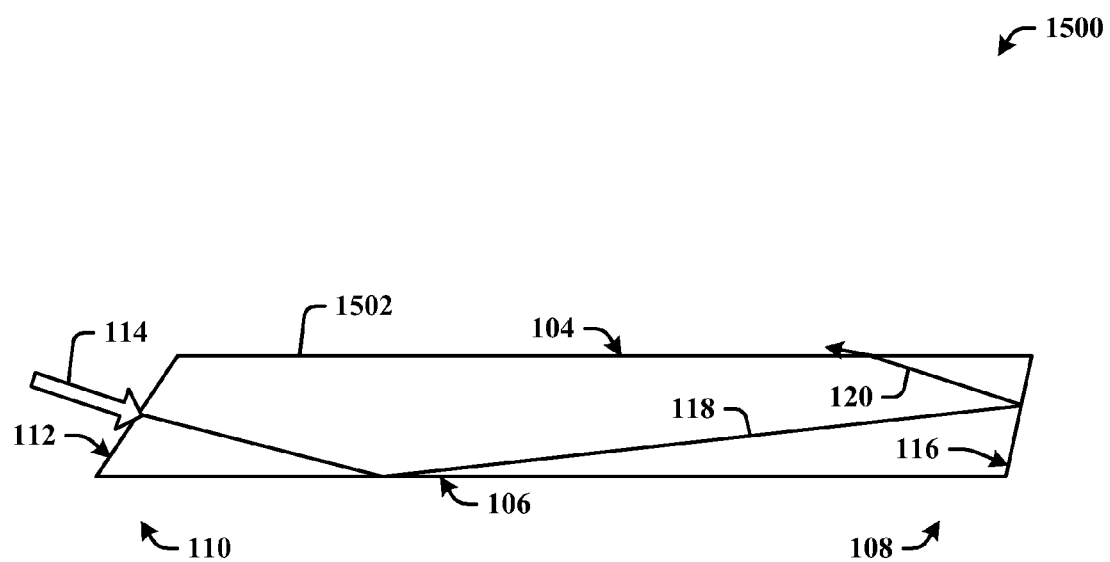
FIG. 15 illustrates an alternative embodiment of a lens system where a light guide uses a graded index between the thin end and the thick end.

FIG. 15 illustrates an alternative embodiment of a lens system 1500 where a light guide 1502 uses a graded index between the thin end 110 and the thick end 108. The lens system 1500 includes the light guide 1502 having the first guide surface 104 and second guide surface 106, which can be parallel, or that taper from the thick end 108 to the thin end 110. The light guide 1502 also includes the receiving face 112 at the thin end 110 for receiving light 114 injected into the light guide 1502, and the reflecting face 116 (also referred as a bevelled or tilted mirror) at the thick end 108 of the light guide 1502 for deflecting incident light 118 back to the first guide surface 104 (and possibly the second guide surface 106), the deflected incident light 120 (or specular light) exiting the first guide surface 104 before reaching the receiving face 112. The graded-index characteristic of the light guide 1502 includes a refractive index that decreases with increasing distance from the thin end 110, such that the light rays follow sinusoidal paths from the thin end 110 to the thick end 108.

Figure 16:
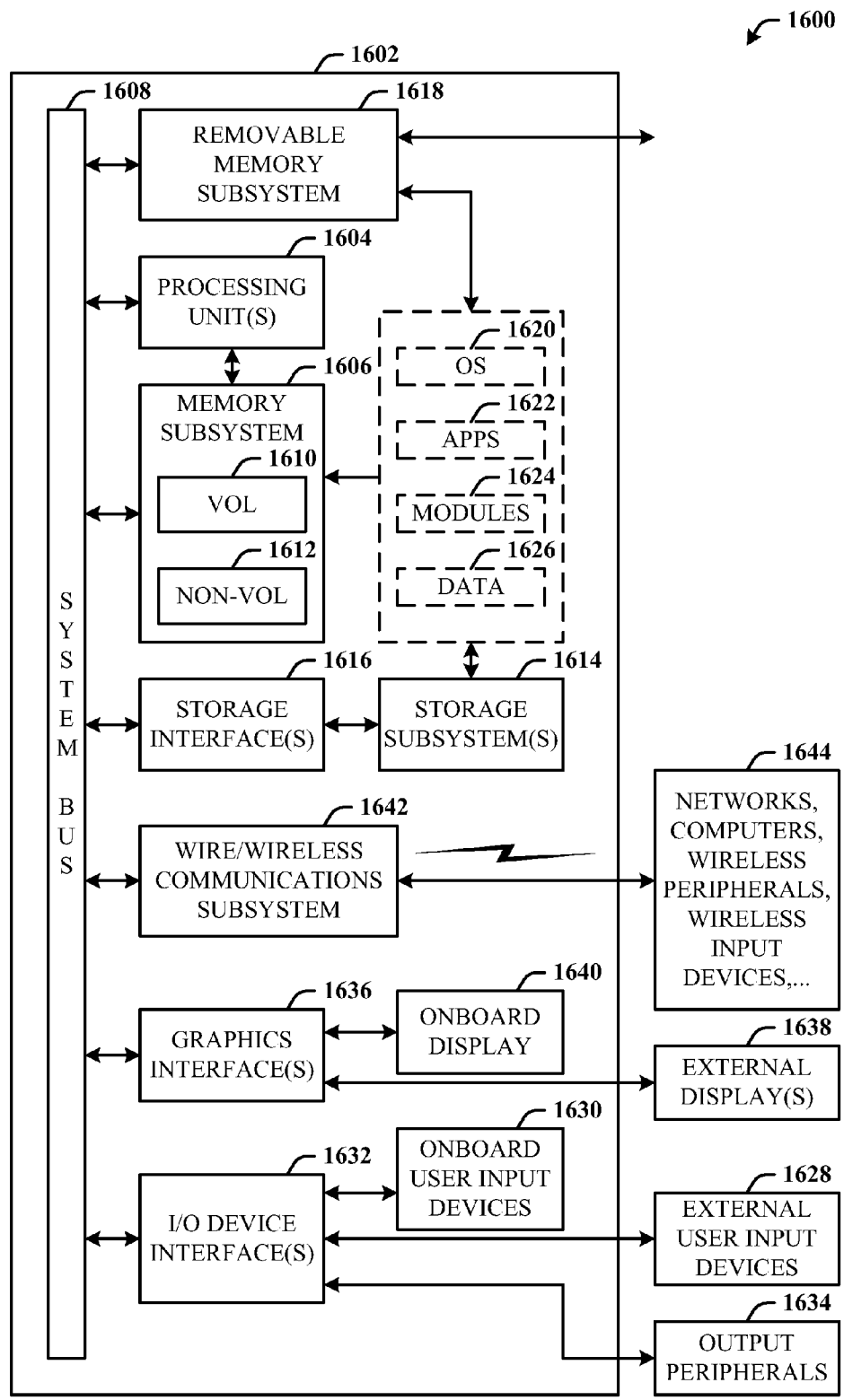
FIG. 16 illustrates a block diagram of a computing system operable to employ the lens system in accordance with the disclosed architecture.

Referring now to FIG. 16, there is illustrated a block diagram of a computing system 1600 operable to employ the lens system in accordance with the disclosed architecture. In order to provide additional context for various aspects thereof, FIG. 16 and the following discussion are intended to provide a brief, general description of the suitable computing system 1600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1600 for implementing various aspects includes the computer 1602 having processing unit(s) 1604, a system memory 1606, and a system bus 1608. The processing unit(s) 1604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1606 can include volatile (VOL) memory 1610 (e.g., random access memory (RAM)) and non-volatile memory (NON-VOL) 1612 (e.g., ROM, EPROM, EEPROM, etc.). A basic input/output system (BIOS) can be stored in the non-volatile memory 1612, and includes the basic routines that facilitate the communication of data and signals between components within the computer 1602, such as during startup. The volatile memory 1610 can also include a high-speed RAM such as static RAM for caching data.

The system bus 1608 provides an interface for system components including, but not limited to, the memory subsystem 1606 to the processing unit(s) 1604. The system bus 1608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1602 further includes storage subsystem(s) 1614 and storage interface(s) 1616 for interfacing the storage subsystem(s) 1614 to the system bus 1608 and other desired computer components. The storage subsystem(s) 1614 can include one or more of a hard disk drive (HDD), a magnetic floppy disk drive (FDD), and/or optical disk storage drive (e.g., a CD-ROM drive DVD drive), for example. The storage interface(s) 1616 can include interface technologies such as EIDE, ATA, SATA, and IEEE 1394, for example.

One or more programs and data can be stored in the memory subsystem 1606, a removable memory subsystem 1618 (e.g., flash drive form factor technology), and/or the storage subsystem(s) 1614, including an operating system 1620, one or more application programs 1622, other program modules 1624, and program data 1626. Generally, programs include routines, methods, data structures, other software components, etc., that perform particular tasks or implement particular abstract data types. All or portions of the operating system 1620, applications 1622, modules 1624, and/or data 1626 can also be cached in memory such as the volatile memory 1610, for example. It is to be appreciated that the disclosed architecture can be implemented with various commercially available operating systems or combinations of operating systems (e.g., as virtual machines).

The storage subsystem(s) 1614 and memory subsystems (1606 and 1618) serve as computer readable media for volatile and non-volatile storage of data, data structures, computer-executable instructions, and so forth. Computer readable media can be any available media that can be accessed by the computer 1602 and includes volatile and non-volatile media, removable and non-removable media. For the computer 1602, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1602, programs, and data using external user input devices 1628 such as a keyboard and a mouse. Other external user input devices 1628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1602, programs, and data using onboard user input devices 1630 such a touchpad, microphone, keyboard, etc., where the computer 1602 is a portable computer, for example. These and other input devices are connected to the processing unit(s) 1604 through input/output (I/O) device interface(s) 1632 via the system bus 1608, but can be connected by other interfaces such as a parallel port, IEEE 1394 serial port, a game port, a USB port, an IR interface, etc. The I/O device interface(s) 1632 also facilitate the use of output peripherals 1634 such as printers, audio devices, camera devices, and so on, such as a sound card and/or onboard audio processing capability.

One or more graphics interface(s) 1636 (also commonly referred to as a graphics processing unit (GPU)) provide graphics and video signals between the computer 1602 and external display(s) 1638 (e.g., LCD, plasma) and/or onboard displays 1640 (e.g., for portable computer). The graphics interface(s) 1636 can also be manufactured as part of the computer system board. The external display(s) 1638 and/or onboard display 1640 can include the lens system disclosed herein.

The computer 1602 can operate in a networked environment (e.g., IP) using logical connections via a wire/wireless communications subsystem 1642 to one or more networks and/or other computers. The other computers can include workstations, servers, routers, personal computers, microprocessor-based entertainment appliance, a peer device or other common network node, and typically include many or all of the elements described relative to the computer 1602. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1602 connects to the network via a wire/wireless communication subsystem 1642 (e.g., a network interface adapter, onboard transceiver subsystem, etc.) to communicate with wire/wireless networks, wire/wireless printers, wire/wireless input devices 1644, and so on. The computer 1602 can include a modem or has other means for establishing communications over the network. In a networked environment, programs and data relative to the computer 1602 can be stored in the remote memory/storage device, as is associated with a distributed system. It will be appreciated that the network connections shown are exemplary and other means of establishing a communications link between the computers can be used.

The computer 1602 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lens system, comprising:
   a tapered light guide having first and second surfaces that taper from a thick end to a thin end;
   a receiving face at the thin end for receiving light injected into the light guide; and
   a reflecting face at the thick end of the light guide for deflecting incident light back to the first and second surfaces, the deflected light exiting the first surface before reaching the receiving face.

2. The system of claim 1, wherein the reflecting face is formed at an angle such that the injected light deflected off the reflecting face exits the first surface or the second surface as collimated light.

3. The system of claim 1, wherein the reflecting face is formed at an angle such that collimated light received at the first surface or the second surface exits the receiving face at a point.

4. The system of claim 1, wherein the injected light fans out from the receiving face and deflects from the reflecting face to illuminate the first surface in its entirety.

5. The system of claim 1, wherein the reflecting face is spherically curved according to a uniform radius of curvature and an angle formed between the first surface and the curved reflecting face is equivalent to an angle formed between the second surface and the curved reflecting face.

6. The system of claim 1, wherein the first and second surfaces are flat and the thick end is twice as thick as the thin end.

7. The system of claim 1, wherein the injected light entering the receiving face includes rays that all undergo a same number of reflections from exiting the receiving face to exiting the light guide.

8. The system of claim 1, wherein the reflecting face is a reflecting grating having layers with refractive indexes that alternate between two index values and thickness that alternates between two thickness values.

9. A lens system, comprising:
   a tapered light guide having a display surface and a second guide surface that taper from a thick end to a thin end, the thick end twice in thickness as the thin end;
   a receiving face at the thin end for receiving light injected into the light guide; and
   a reflecting face at the thick end of the light guide for deflecting incident light back to the display surface, the reflecting face tilted to reduce angles of specular rays relative to a plane of the light guide so that the specular rays exit the display surface before reaching the receiving face.

10. The system of claim 9, wherein the tilted reflecting face is a Fresnellated surface.

11. The system of claim 9, wherein the tilted reflecting face is curved about a point distant from the thin end by one light guide length in a direction parallel to an axis of the taper.

12. The system of claim 9, wherein the reflecting face includes one or more reflecting gratings having layers with refractive indexes that alternate between two index values and thickness that alternates between two thickness values, the one or more reflective grating eliminate aperture diffraction.

13. The system of claim 9, wherein the reflecting face is spherically curved according to a uniform radius of curvature, and an angle formed between the display surface and the curved reflecting face is equivalent to an angle formed between the second surface and the curved reflecting face.

14. The system of claim 13, wherein the display surface and the second guide surface each form a right angle to the reflecting face at the thick end.

15. The system of claim 9, wherein the reflecting face is comprised of three sets of Bragg gratings for illuminating the display surface using red, green and blue colors.

16. The system of claim 9, wherein the light is injected into a center of the thin end to eliminate a blank margin for fan out.

17. The system of claim 9, wherein the reflecting face deflects the incident light such that the specular light exits the display surface at a point dependent on an angle of injection of the light.

18. A lens system, comprising:
- a wedge-shaped light guide having a display surface and a second guide surface that taper from a thick end to a thin end;
- a receiving face at the thin end for receiving light injected into the light guide; and
- a reflecting surface at the thick end of the light guide for deflecting incident light back to the display surface, the reflecting surface tilted and curved about a point distant from the thin end of the light guide by one light guide length in a direction parallel to an axis of the taper.

19. The system of claim 18, wherein the display surface and the second guide surface transition to a section at the thick end where the display surface is parallel to the second guide surface, and the thick end is twice as thick as the thin end.

20. The system of claim 19, wherein the reflecting surface is a Fresnellated surface having alternating planes of reflective surfaces at correspondingly alternating angles, the planes having normals that share a same component resolved in a plane of the light guide and equal but opposite components perpendicular to the plane of the light guide.

* * * * *